Patented Sept. 19, 1944

2,358,430

UNITED STATES PATENT OFFICE 2,358,430

METHOD OF PREPARING PECTINATE

John J. Willaman, Plymouth Meeting, and Hugh H. Mottern and Claude H. Hills, Philadelphia, Pa., and George L. Baker, Newark, Del., assignors to Claude R. Wickard, as Secretary of Agriculture of the United States of America, and his successors in office No Drawing. Application September 14, 1942, Serial No. 458,336

4 Claims. (Cl. 195—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a simplified process for producing a pectic material of lowered methoxy content, and has for its objects the preparation of such a pectic material by a method involving moderate temperatures, low acidity, and a short reaction time; controlling, simply and with precision, the degree of reduction of the methoxyl; and conducting the process in a manner not involving the use of highly corrosive chemicals.

Since there is some confusion in nomenclature, the following definitions are given. By "pectin" is meant the familiar preparation of commerce or of the laboratory, prepared from plant extracts by precipitation with alcohol, acetone, or metallic salts, with no attempt to modify its natural methoxy content. The latter varies from about 10 to 14 percent. By "pectic acid" is meant a more or less completely demethoxylated pectin, usually attained by treating pectin with alkali. By "pectinic acid" is meant any one of a series of derivatives of pectin with methoxy content intermediate between that of pectin and pectic acid. In the present application, the term "pectinic acid" is used generically to indicate either the acid itself or its salts. By "pectase" is meant the enzyme which hydrolyzes the methyl ester, or methoxy, groups in pectin, liberating an acid group for each methoxy group involved.

Since removal of each methoxy group liberates an acid group in the pectin molecule, as demethoxylation proceeds the pectinic acids produced become increasingly acidic and can produce salts with more and more atoms of bases. If calcium, for example, is the base, the following series of changes take place: The parent substance, pectin, has few free carboxyl groups, its calcium salt has a very low calcium content and the calcium salt is soluble in water. As the methoxy groups are removed, and pectinic acids are produced, more and more calcium is required for neutral salt formation, and a stage is reached in which the calcium salt is insoluble in water, and either precipitates or forms a gel. When the pectic acid stage is reached, the calcium content is at a maximum, and the salt is an extremely insoluble gel.

Gel formation in the presence of calcium is first seen when the methoxy content of the pectin has been reduced from its original level, about 10–14 percent, to a level of about 6–8 percent, depending on the origin of the pectin and on various conditions obtaining in the solution. Furthermore, the character and properties of the calcium pectinate gels vary as reduction proceeds from the first pectinic acid which forms a calcium gel to pectic acid. These different types of calcium gels are suitable for various purposes. Metals other than calcium also form a series of pectinates of varying characteristics and useful for varying purposes. It thus becomes an important matter to be able to control the demethoxylation of pectin so as to produce a pectinic acid of desired properties.

It is well known that the gelling properties of pectic compounds in general depend to a very large extent on the molecular weight, or degree of aggregation, of the compound. The most useful index to this degree of molecular aggregation is the viscosity of the water solution or suspension of the compound. A comparatively high viscosity means high degree of gelling power, and a low viscosity, low gelling power. It is obvious, then, that when pectinic acids of high gelling power are desired, the removal of the required methoxy groups must be accomplished by a method that maintains to as great a degree as possible a high molecular weight, and hence a high viscosity.

The conventional method for removal of the methoxy groups from pectin is to treat a water solution of the latter with an alkali at moderate temperature. Demethoxylation proceeds quickly and readily, and can be controlled by the amount of alkali used. However, by this treatment the molecular aggregation is largely destroyed, yielding products of low gelling power. Demethoxylation can also be attained by treatment with very strong acid at relatively high temperatures. Such a method is described by Olsen and Stuewer in U. S. Patent No. 2,132,577, and by Goodwin and Baker in U. S. Patent No. 2,233,574. The former treat a pectin containing material with a mineral acid solution of pH less than 1.0, at temperatures of 33° to 45° C. for periods of 36 to 92 hours. The latter treat the pectin containing material with a hydrochloric acid solution of pH about 1.45 at 56° C. for 72 hours.

We have now found that pectinic acids of superior gelling power can be obtained in a far shorter time, at moderate temperatures and acidity, and under excellent control, by the use of the enzyme pectase. This method is the subject of the present invention.

Kertesz (Ergebinsse der Enzymforschung 5:255 (1936)) used pectin methoxylase (pectase) to hydrolyse pectin solutions until 40 percent and 60 percent, respectively, of the contained methoxy had been removed. He then added calcium chloride solution, and studied the formation of calcium gels as the pectase action continued. He did not stop the hydrolysis at any predetermined stage, nor did he isolate the pectinic acids produced by this process. Kertesz also (Journal of Biological Chemistry 121:589-597 (1937)) developed a method for the determination of pectase activity and studied the optimal conditions for use of the enzyme. He did not, however, isolate the produced pectinic acids nor their salts.

We have found pectase to be ideal for reducing the methoxy content of pectin in the preparation of pectinic acids. The conditions of action are mild, the course of hydrolysis regular, and it can be stopped at any predetermined point. No undesirable substances or substances difficult to remove are added with the pectase.

The principle of the method is briefly as follows: A dispersion of pectin is brought to a pH favorable to the action of pectase and not unfavorable to the pectin, such as pH 6.0, by the addition of an alkali, such as standard sodium hydroxide solution. The temperature of the dispersion is brought to a point favorable to the action, preferably to about 40-45° C. Pectase is then added in an amount determined by preliminary experiment to be suitable for the conditions obtaining. The mixture is kept stirred constantly. As the enzyme acts on the methoxy groups, free acid groups are formed, which lower the pH. If this were allowed to continue, the pH would soon reach a level decidedly unfavorable to further enzyme action. Therefore, standard alkali solution is added more or less continuously in such amounts as will maintain the pH constant. When an amount of alkali has been added that corresponds to the desired degree of demethoxylation of the pectin involved, the pectase action is stopped by heating the batch quickly to about 70-80° C., or by adding enough strong acid to bring the pH to about 3-4 and then heating. The pectinic acid thus prepared can be then worked up in any conventional and desired way, either to a concentrated solution or to a dry product.

The pectin used in the above briefly described method may be the extract of apple pomace or citrus peel obtained by the usual methods, or it may be a dried preparation, such as any commercial pectin, dispersed in water. The preferred concentration of pectin is from 0.3 to 1.0 percent, although this is largely a matter of convenience and personal preference.

The preferred pH is about 6. At lower values the enzyme is much less active, and at higher values the pectin is adversely affected by the medium itself, tending to lose methoxy groups and to lose viscosity and hence gel strength.

The temperature of the reaction may be as high as 60° C., but it is most economical to use a temperature of 40-45° C. This is the optimal temperature for pectase for a reaction period of an hour or two.

The pectase preparation used must be essentially free from pectinase. The latter enzyme causes a splitting of the chain of the pectin molecule, with loss of viscosity and hence of gel strength. Good sources of pectase free from pectinase are tobacco stems and the fruits of tomato and of eggplant. Many molds produce pectase, but the latter is usually accompanied by pectinase, making them unsuitable sources. Juice from alfalfa and from lilac leaves may be used, but they should be tested carefully for pectinase first. The ground fruit of tomato or of eggplant, or any suitable source of pectase, may be used directly. If a clear extract of these materials is desired, it may be prepared by bringing the ground fruit to a pH of 5 to 7 by means of alkali and filtering or pressing, according to the method described in copending application Serial No. 458,335, filed September 14, 1942, by John J. Willaman and Claude H. Hills. At this region of pH value, the pectase is desorbed from the pulp and fiber, and appears in the clear extract.

The preferred method of maintaining a more or less constant pH during the action of the enzyme is by means of an ordinary glass electrode and pH meter. The glass electrode and potassium chloride terminal, connected by lead wires of any desired length to the pH meter proper, are submerged in the vessel containing the pectin reaction mixture. After the pectase has been added, a standard alkali, such as sodium hydroxide solution, is added at such a rate that the pH will be maintained at a desired value, such as pH 6.0. The alkali is added from any convenient continuously measuring device, such as a burette or calibrated jar or tank. Another method is to add alkali at a rate that is assumed to be about correct, and check this at intervals by withdrawing a small portion of the reacting mixture and determining its pH by means of a dye indicator suitable for the pH chosen, such as methyl red indicator for pH 6.0, or the pH of these small portions can be determined in any other conventional manner.

When an amount of alkali has been consumed in the reaction mixture which corresponds to the desired degree of demethoxylation for the amount of pectin present, the pectase action is stopped as described above. The point of desired degree of demethoxylation is easily calculated by the following formula:

$$\frac{\text{grams methoxy to be removed}}{0.031} = \text{cc. normal alkali to be consumed}$$

For example, if there are 100 grams of pectin in the reaction mixture with a 12 percent methoxy content, and a pectinic acid of 7 percent methoxy is desired, 5 percent, or 5 grams of methoxy must be removed. Hence, when $$\frac{5}{0.031} = 161 \text{ cc. normal alkali have been consumed}$$

a pectinic acid of 7 percent methoxy has been attained, and the reaction is stopped. To use this method, of course, the amount of pectin in the reaction mixture and its methoxy content must be known within certain limits of error, which are governed by the desired accuracy in the composition of the final product. Many modifications of the above principle, such as strength of alkali, degree of demethoxylation and other items, will be obvious to one familiar with the science of chemistry.

When the reaction mixture has thus been brought to the desired degree of methoxy removal and any further enzyme action stopped, the pectinic acid produced may be worked up in any desired manner. It may be filtered, concentrated, precipitated with alcohol, acetone or aluminum or calcium salt; in other words, it may be handled in the same way as ordinary pectin solutions, to produce a finished product in either liquid or dry form.

The pectinic acids produced by this process are more highly polymerized than those produced by strong acid, and are therefore of greater gel strength when made into a calcium gel.

The following specific examples of the above described process are illustrative of a few applications of the invention.

Example 1

To a tank equipped with stirrer were added 133.5 pounds of apple pomace extract containing 0.48 percent pectin of 10.4 percent methoxy. A glass electrode was immersed in the pectin and connected to a pH meter by 3-foot lead wires. A pectinic acid of 5.6 percent methoxy was desired. Thus 4.8 percent methoxy was to be removed by pectase action. The grams of methoxy to be removed were $$133.5 \times 0.0048 \times 453 \times 0.048 = 13.93 \text{ grams.}$$

This is equivalent to $$\frac{13.93}{0.031} = 450 \text{ cc. of normal alkali}$$

The 133.5 pounds of extract were adjusted to pH 6.5 and brought to a temperature of 40° C. Then 750 cc. of tomato juice serum, prepared free from pulp at pH 6.5 as described above, were added. The mixture was stirred constantly. Acidity began to develop immediately, and normal sodium hydroxide was added more or less continuously to maintain the pH at 6.5. When 450 cc. of alkali had been added, strong hydrochloric acid was added until the pH was 4.0. The mixture was heated to 72° C., held there a few minutes, then cooled to about 40° C., and the pectinic acid precipitated with alcohol and dried in the usual manner. Analysis showed it to have 5.3 percent methoxy, which is very close to the 5.6 percent aimed at.

Example 2

A tank with stirrer and glass electrode, as in Example 1, was used. To it were added 45 pounds of extract of pomace containing 0.32 percent pectin of 10.5 percent methoxy. A pectinic acid of 4.2 percent methoxy was desired. Hence 6.3 percent methoxy on the weight of the pectin in solution had to be removed by pectase action. The grams of methoxy to be removed were $45 \times 0.0032 \times 453 \times 0.063 = 4.1$ grams. This is equivalent to $$\frac{4.1}{0.031} = 132.5 \text{ cc. normal alkali}$$

The extract was heated to 40° C., and the pH adjusted to 6.0, the stirrer running continuously. Then 60 cc. of tomato juice, freed from pulp as described above, were added. The pH was kept practically at 6.0 by the more or less continuous addition of normal sodium hydroxide solution. Since the rate of alkali consumption was about 4 cc. per minute, and since it was judged that about three minutes would be required to raise the temperature of the mixture to 70°, when the alkali consumption had reached 120 cc., steam was turned on till 70° C. was attained in order to inactivate the pectase. The whole reaction time was 34 minutes. The mixture was cooled, and the pectinic acid prepared in a dry form with alcohol in a way conventional for pectin. Analysis showed it to have 3.8 percent methoxy, which is close to the 4.2 percent desired.

Having thus described our invention, we claim:

1. A process of preparing highly polymerized pectinic acids of predetermined methoxy content comprising adding a pectase preparation which is essentially free from pectinase to a solution of pectin, adding alkali at such a rate as will maintain an essentially constant pH favorable to pectase action, stopping the addition of alkali when the desired degree of demethoxylation has occurred, and heating to prevent further action of the enzyme.

2. A process of preparing a highly polymerized pectinic acid of predetermined methoxy content comprising treating pectin in solution with pectase, maintaining an essentially constant pH favorable to pectase action by the continual addition of alkali in known amounts, stopping the addition of alkali when the quantity added indicates that the desired degree of demethoxylation has been reached, adding strong acid to bring the pH to at most 4, heating the solution to about 70–80° C., cooling to below 40° C., precipitating the pectinic acid with alcohol, filtering, and drying the pectinic acid.

3. A process of preparing highly polymerized pectinic acids of a desired predetermined methoxy content comprising adding a pectase preparation which is essentially free from pectinase to a solution of pectin, adding alkali at such a rate as will maintain the pH at about 6, the while maintaining the temperature at about 40–45° C., whereby favorable conditions for pectase action are obtained, stopping the addition of alkali when the desired degree of demethoxylation has been reached, and stopping any further enzyme action.

4. A method of preparing highly polymerized pectinic acids of a desired predetermined methoxy content comprising adding pectase to a solution of a known amount of pectin having a known methoxy content, adding alkali at such a rate as will maintain a pH favorable to pectase action, the while maintaining the temperature favorable to the action, the amount of alkali added being that calculated to neutralize the amount of acids formed in the demethoxylation of the pectin to give the predetermined methoxy content of pectinic acid, and stopping the action of the enzyme when the desired degree of demethoxylation has been reached.

JOHN J. WILLAMAN.
HUGH H. MOTTERN.
CLAUDE H. HILLS.
GEORGE L. BAKER.